(12) United States Patent
Yang et al.

(10) Patent No.: US 11,937,751 B2
(45) Date of Patent: Mar. 26, 2024

(54) MOVABLE ELECTRIC DEVICE

(71) Applicants: GUANGDONG MIDEA WHITE HOME APPLIANCE TECHNOLOGY INNOVATION CENTER CO., LTD., Foshan (CN); MIDEA GROUP CO., LTD., Foshan (CN)

(72) Inventors: Pin Yang, Foshan (CN); Jiefeng Cheng, Foshan (CN); Xinjian Huang, Foshan (CN); Shuyun Wu, Foshan (CN); Junge Zhang, Foshan (CN)

(73) Assignees: GUANGDONG MIDEA WHITE HOME APPLIANCE TECHNOLOGY INNOVATION CENTER CO., LTD., Foshan (CN); MIDEA GROUP CO., LTD., Foshan (CN)

(*) Notice: Subject to any disclaimer, the term of this patent is extended or adjusted under 35 U.S.C. 154(b) by 444 days.

(21) Appl. No.: 17/287,529

(22) PCT Filed: Nov. 9, 2018

(86) PCT No.: PCT/CN2018/114887
§ 371 (c)(1),
(2) Date: Apr. 22, 2021

(87) PCT Pub. No.: WO2020/093389
PCT Pub. Date: May 14, 2020

(65) Prior Publication Data
US 2021/0393100 A1 Dec. 23, 2021

(51) Int. Cl.
*A47L 11/40* (2006.01)
*A47L 11/24* (2006.01)
(Continued)

(52) U.S. Cl.
CPC .......... *A47L 11/4011* (2013.01); *A47L 11/24* (2013.01); *A47L 11/4002* (2013.01);
(Continued)

(58) Field of Classification Search
None
See application file for complete search history.

(56) References Cited

U.S. PATENT DOCUMENTS

2005/0188495 A1 9/2005 Takenaka
2007/0069680 A1* 3/2007 Landry ................. A47L 9/281
318/580
(Continued)

FOREIGN PATENT DOCUMENTS

CN 1486669 A 4/2004
CN 103827796 A 5/2014
(Continued)

OTHER PUBLICATIONS

Lee Sung Yul_KR 20130020062 A_2013_Machine tranlation (Year: 2013).*
(Continued)

*Primary Examiner* — Jermele M Hollington
*Assistant Examiner* — Suresh K Rajaputra

(57) ABSTRACT

The present disclosure provides a movable electric device. The movable electric device includes a movable device body and a contact detection electrode. The movable device body has an electric drive means. The contact detection electrode is mounted on the movable device body. When the contact detection electrode _contacts diffusible dirt, a resistance, capacitance or impedance of the contact detection electrode varies.

23 Claims, 10 Drawing Sheets

(51) Int. Cl.
*G01N 27/04* (2006.01)
*G01N 27/22* (2006.01)

(52) U.S. Cl.
CPC ....... *A47L 11/4038* (2013.01); *A47L 11/4041* (2013.01); *A47L 11/4066* (2013.01); *A47L 11/4072* (2013.01); *G01N 27/04* (2013.01); *G01N 27/226* (2013.01); *A47L 2201/04* (2013.01); *A47L 2201/06* (2013.01)

(56) References Cited

U.S. PATENT DOCUMENTS

| | | | |
|---|---|---|---|
| 2010/0063628 A1 | 3/2010 | Landry et al. | |
| 2015/0107449 A1* | 4/2015 | Son | A47L 9/19 95/2 |
| 2021/0121032 A1* | 4/2021 | Kim | A47L 11/4061 |
| 2021/0389772 A1* | 12/2021 | Kim | A47L 11/4002 |

FOREIGN PATENT DOCUMENTS

| | | | | |
|---|---|---|---|---|
| CN | 106137058 A | * | 11/2016 | A47L 11/40 |
| CN | 106137058 A | | 11/2016 | |
| CN | 106333631 A | | 1/2017 | |
| CN | 206403711 U | * | 8/2017 | A47L 1/02 |
| CN | 206403711 U | | 8/2017 | |
| CN | 107913030 A | | 4/2018 | |
| EP | 2573639 A2 | | 3/2013 | |
| EP | 2618138 A2 | * | 7/2013 | D06F 39/004 |
| EP | 2618138 A2 | | 7/2013 | |
| JP | S63132153 A | | 6/1988 | |
| JP | H073444 B2 | | 1/1995 | |
| JP | 2015220934 A | | 12/2015 | |
| KR | 20110119196 A | | 11/2011 | |
| KR | 20130020062 A | * | 2/2013 | A47L 9/009 |
| KR | 20140049751 A | | 4/2014 | |
| KR | 20170047790 A | | 5/2017 | |
| WO | 9958051 A1 | | 11/1999 | |

OTHER PUBLICATIONS

Han, Jian-hui_CN_206403711 U_2017_Machine translation (Year: 2017).*
Gruden_EP 2618138 A2_2013_Machine Translation (Year: 2013).*
Zhang et al_CN 106137058 A_2016_Machine Translation (Year: 2016).*
International search report, International Application No. PCT/PCT/CN2018/114887, dated Apr. 19, 2019 (15 pages).
Chinese First office action, Chinese Application No. 201880039203.8, dated Apr. 15, 2021(40 pages).
Notice of Reasons for Refusal for JP Application No. 2021-523233, dated May 31, 2022 (12 pages).
Korean First office action for KR Application No. 20217014041, dated Dec. 8, 2022 (13 pages).
Japanese Notice of Reasons for Refusal received in JP Application No. 2021-523233; dated Oct. 18, 2022.
Japanese Decision to Grant a Patent in JP Application No. 2021-523233; dated Feb. 14, 2023.
European Examination Report received in EP Application No. 18939194.9; dated Jun. 28, 2023.
European search report, European Application No. 18939194.9, dated Oct. 6, 2021 (6 pages).

* cited by examiner

MOVABLE ELECTRIC DEVICE

CROSS-REFERENCES TO RELATED APPLICATIONS

The present disclosure is a national phase application of International Application No. PCT/CN2018/114887, filed on Nov. 9, 2018, the entireties of which are herein incorporated by reference.

FIELD

The present disclosure relates to the field of cleaning, and particularly to a movable electric device.

BACKGROUND

When detecting pet excrements, sweeping robots typically use non-contact sensors such as infrared sensors and odor sensors. Since the sensors do not directly contact the excrements, detection of the excrements is rendered inaccurate, which is not conducive for the sweeping machine to make an accurate judgment of the detection results.

SUMMARY

A main object of the present disclosure is to provide a movable electric device, for improving an accuracy with which the movable electric device detects diffusible dirt.

In order to achieve the above-mentioned object, the movable electric device provided by the present disclosure is configured to detect or clean up wastes. The movable electric device includes a movable device body and a contact detection electrode. The movable device body has an electric drive means. The contact detection electrode is mounted on the movable device body. When the contact detection electrode contacts diffusible dirt, a resistance, capacitance or impedance of the contact detection electrode varies.

In some embodiments, the contact detection electrode includes a ring-shaped positive electrode and a ring-shaped negative electrode. The ring-shaped negative electrode is provided to sleeve an outer side of the ring-shaped positive electrode or provided inside the ring-shaped positive electrode. A detection area is formed between the ring-shaped positive electrode and the ring-shaped negative electrode.

In some embodiments, the contact detection electrode includes a comb-teeth positive electrode and a comb-teeth negative electrode. The comb-teeth positive electrode includes a positive electrode connecting arm and positive electrode teeth arranged along a length direction of the positive electrode connecting arm. The comb-teeth negative electrode includes a negative electrode connecting arm and negative electrode teeth arranged along a length direction of the negative electrode connecting arm. The positive electrode teeth and the negative electrode teeth are arranged in a staggered manner to form a detection area between the positive electrode teeth and the negative electrode teeth.

In some embodiments, the contact detection electrode includes a curvilinear positive electrode and a curvilinear negative electrode. The curvilinear positive electrode bends and extends along a direction. The curvilinear negative electrode extends along a length direction of the curvilinear positive electrode to form a detection area between the curvilinear positive electrode and the curvilinear negative electrode.

In some embodiments, the curvilinear positive electrode extends in the form of one or more of a sine curve, a cosine curve, a normal distribution curve, a parabola, a wave polyline, and a square wave curve. Or the curvilinear negative electrode extends in the form of one or more of a sine curve, a cosine curve, a normal distribution curve, a parabola, a wave broken line, and a square wave curve.

In some embodiments, the contact detection electrode includes positive and negative electrode points arranged in a staggered manner. A detection area is formed between the positive electrode points and the negative electrode points.

In some embodiments, the contact detection electrode includes positive electrode plates and negative electrodes. The plurality of positive electrode plates are arranged radially from the center to the periphery. The plurality of negative electrodes are located in gaps between adjacent positive electrode plates. A detection area is formed between the positive electrode plates and the negative electrodes.

The contact detection electrode includes negative electrode plates and positive electrodes. The plurality of negative electrode plates are arranged radially from the center to the periphery. The plurality of positive electrodes are located in gaps between adjacent negative electrode plates. A detection area is formed between the negative electrode plates and the positive electrodes.

In some embodiments, when the positive electrode plates are arranged radially, the negative electrodes are arranged in a circle with a radiation center of the positive electrode plates as a center of the circle. When the negative electrode plates are arranged radially, the positive electrodes are arranged in a circle with a radiation center of the negative electrode plates as a center of the circle.

In some embodiments, the contact detection electrode includes a central positive electrode and negative electrodes arranged circumferentially around the central positive electrode. A detection area is formed between the central positive electrode and the negative electrodes. Or the contact detection electrode includes a central negative electrode and positive electrodes arranged circumferentially around the central negative electrode. The detection area is formed between the central negative electrode and the positive electrodes.

In some embodiments, the contact detection electrode includes a positive electrode and a negative electrode. A thickness of the positive electrode is greater than a thickness of the negative electrode, or the thickness of the negative electrode is greater than the thickness of the positive electrode.

In some embodiments, the contact detection electrode includes a positive electrode and a negative electrode. The positive electrode and/or the negative electrode have pointed teeth. Or the positive electrode and/or the negative electrode have arc-shaped transitions.

In some embodiments, there are multiple groups of contact detection electrodes. A thickness of at least one group of the contact detection electrodes is greater than a thickness of the other contact detection electrodes.

In some embodiments, the contact detection electrode includes a positive electrode and a negative electrode. The positive electrode and the negative electrode have a flexibility and a length of the positive electrode and the negative electrode is smaller than half of a distance between adjacent positive and negative electrodes.

In some embodiments, the movable device body includes a housing and a roller provided at a bottom portion of the housing. The contact detection electrode is provided on an outer peripheral surface and/or side portion of the roller.

In some embodiments, the contact detection electrode includes a positive electrode and a negative electrode. The positive electrode includes positive electrode plates connected by a connector. A positive electrode gap is provided between two adjacent positive electrode plates. The negative electrode includes negative electrode plates connected by a connector. A negative electrode gap is provided between two adjacent negative electrode plates. The positive electrode and the negative electrode are arranged in parallel. Further, the positive electrode plates are configured to correspond to the negative electrode gaps, and the negative electrode plates are configured to correspond to the positive electrode gaps.

In some embodiments, the positive electrode and the negative electrode are arranged in a ring shape, and surround the outer peripheral surface of the roller along a peripheral direction of the roller.

In some embodiments, the movable device body includes a first baffle provided on a axial side of the roller. The contact detection electrode is provided on the first baffle.

In some embodiments, the contact detection electrode is mounted at a bottom portion of the first baffle.

In some embodiments, the contact detection electrode includes a positive electrode and a negative electrode. The positive electrode and/or the negative electrode are/is mounted on a side of the first baffle facing the roller, and the negative electrode and/or the positive electrode are mounted on a side of the roller facing the first baffle.

In some embodiments, a rotating shaft of the roller is rotatably connected to the first baffle.

In some embodiments, a peripheral side wall of the roller is provided with a mounting cavity. The contact detection electrode is mounted in the mounting cavity. A top portion of the contact detection electrode is flush with an opening of the mounting cavity or lower than an edge of the opening.

In some embodiments, the movable device body includes a second baffle provided on an upper portion of the roller. The contact detection electrode is mounted on the second baffle.

In some embodiments, the contact detection electrode includes a positive electrode and a negative electrode. The positive electrode and/or the negative electrode are mounted on the second baffle; and the negative electrode and/or the positive electrode are mounted on the roller.

In some embodiments, there are multiple groups of contact detection electrodes. Groups of the contact detection electrodes are distributed on multiple positions of the movable device body.

In some embodiments, the movable device body includes a chassis. The contact detection electrode is provided on the chassis.

In some embodiments, the contact detection electrode includes an insulating substrate, and a positive electrode and a negative electrode both mounted on the insulating substrate. A detection area is formed between the positive electrode and the negative electrode.

In some embodiments, the contact detection electrode includes a fixing part and a detecting part connected to the fixing part. The fixing part is detachably connected to the chassis.

The detecting part extends in a direction away from the fixing part.

In some embodiments, the contact detection electrode is configured in an elongate-strip shape, and extends along a peripheral direction of the chassis.

In some embodiments, the contact detection electrode is provided in proximity to an edge of a front side of the chassis.

In some embodiments, the movable device body includes a side brush. A mounting platform of the side brush protrudes outward. The contact detection electrode is provided on the mounting platform.

In some embodiments, the number of side brushes is two. The two side brushes are provided on a left side and a right side of a front side of the bottom portion of the housing respectively. The contact detection electrode is mounted on a side of the mounting platform facing the middle.

In some embodiments, the contact detection electrodes are mounted on the side brushes.

In some embodiments, the movable device body includes a rolling brush provided in the middle of the housing. The contact detection electrode is mounted on the rolling brush.

In some embodiments, the contact detection electrode is a flexible electrode. The contact detection electrode is arranged in parallel with bristles of the rolling brush.

In some embodiments, the movable device body includes a housing. The contact detection electrode is provided on a peripheral side wall of the housing.

In some embodiments, the contact detection electrode includes a flexible substrate. The positive electrode and the negative electrode of the contact detection electrode are mounted on the flexible substrate. The flexible substrate is wound and mounted on the peripheral side wall of the housing.

In some embodiments, the positive electrode includes positive electrode plates. The negative electrode includes negative electrode plates. The positive electrode plates and the negative electrode plates are arranged sequentially in a staggered manner on the flexible substrate.

In some embodiments, the positive electrode plates and the negative electrode plates extend along a length direction of the flexible substrate or along a width direction of the flexible substrate.

In some embodiments, the positive electrode plates and/or the negative electrode plates are attached and fixed to a surface of the flexible substrate.

In some embodiments, an end of each of the positive electrode plates and/or the negative electrode plates is connected to the surface of the flexible substrate, and the other end thereof extends in a direction away from the flexible substrate.

In some embodiments, the flexible substrate is mounted on a lower portion of the peripheral side wall of the housing. The positive electrode plates and/or the negative electrode plates extend towards the bottom portion of the housing.

In some embodiments, the positive electrode includes positive electrode bumps, and the negative electrode includes negative electrode bumps. The positive electrode bumps and the negative electrode bumps are arranged sequentially in a dot matrix. The dot matrix is arranged on the surface of the flexible substrate.

In some embodiments, the movable electric device is a movable detection device or a movable cleaning device.

AND BRIEF DESCRIPTION OF THE DRAWINGS

In order to explain the technical solutions in embodiments of the present disclosure or the prior art more clearly, drawings required to be used in the description of the embodiments or the prior art will be briefly introduced. Evidently, the drawings in the following description are merely some of the embodiments of the present disclosure.

FIG. 16 is a partially enlarged diagram taken from and marked by a circle B in FIG. 15.

FIG. 18 is a partially enlarged view taken from and marked by a circle C in FIG. 17.

FIG. 20 is a partially enlarged view taken from and marked by a circle D in FIG. 19.

FIG. 22 is a partially enlarged view taken from and marked by a circle E in FIG. 21.

Figure 1:
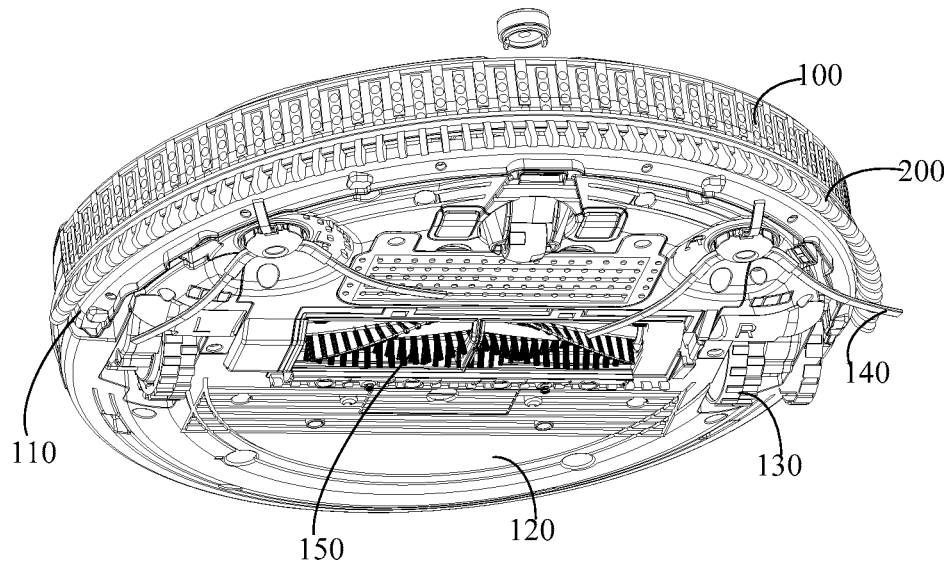
FIG. 1 is a schematic structural diagram of an embodiment of a movable electric device according to the present disclosure.

| Reference Numbers | Names |
|---|---|
| 100 | Movable device body |
| 110 | Housing |
| 120 | Chassis |
| 130 | Roller |
| 131 | Outer peripheral surface |
| 140 | Side brush |
| 141 | Mounting platform |
| 150 | Rolling brush |
| 160 | Second baffle |
| 170 | First baffle |
| 200 | Contact detection electrode |
| 211 | Ring-shaped positive electrode |
| 212 | Ring-shaped negative electrode |
| 221 | Curvilinear negative electrode |
| 222 | Curvilinear positive electrode |
| 231 | Positive electrode point |
| 232 | Negative electrode point |
| 241 | Central positive electrode |
| 242 | Negative electrode |
| 251 | Comb-teeth positive electrode |
| 252 | Positive electrode connecting arm |
| 253 | Positive electrode teeth |
| 254 | Comb-teeth negative electrode |
| 255 | Negative electrode teeth |
| 256 | Negative electrode connecting arm |
| 261 | Positive electrode |
| 262 | Positive electrode plate |
| 263 | Positive electrode connector |
| 264 | Positive electrode gap |
| 265 | Negative electrode |
| 266 | Negative electrode plate |
| 267 | Negative electrode connector |
| 268 | Negative electrode gap |
| 271 | Positive electrode |
| 272 | Negative electrode |
| 281 | Positive electrode plate |
| 282 | Negative electrode |
| 283 | Fixing part |
| 284 | Detecting part |
| 291 | Flexible substrate |
| 292 | Positive electrode plate |
| 293 | Negative electrode plate |
| 215 | Insulating substrate |
| 216 | Substrate positive electrode |
| 217 | Substrate negative electrode |
| 294 | Positive electrode bump |
| 295 | Negative electrode bump |

Realization of the object, the functional characteristics and the advantages of the present disclosure will be further described in conjunction with the embodiments and with reference to the accompanying drawings.

DETAILED DESCRIPTION OF THE DISCLOSURE

The technical solutions in the embodiments of the present disclosure will be clearly and completely described below in conjunction with the accompanying drawings in the embodiments of the present disclosure. The described embodiments are only a part of the embodiments of the present disclosure, rather than all the embodiments.

It should be noted that, all the directional indications (such as up, down, left, right, front, back . . . ) in the embodiments of the present disclosure are only used to explain relative position relationships, movement conditions and the like between various components in a specific posture (as shown in the accompanying drawings). If the specific posture varies, the directional indications will change accordingly.

Furthermore, the descriptions related to "first", "second", and the like in the present disclosure are only used for descriptive purposes, and shall not be construed as indicating or implying their relative importance or implicitly indicating the number of indicated features. Therefore, the features defined with "first" and "second" may explicitly or implicitly include at least one of these features. When the combination of the embodiments involves a contradiction or cannot be carried out, it should be considered that such a combination of the embodiments does not exist, and does not fall within the protection scope claimed by the present disclosure.

The present disclosure mainly proposes a movable electric device. The movable electric device can be a movable cleaning device such as a sweeping robot (with detecting and cleaning functions at the same time), or an electric detection device with only a detecting function. The movable electric device has a contact detection electrode. The contact detection electrode has a detection area. When the contact detection electrode comes into contact with diffusible dirt, one of a resistance value, capacitance value and impedance value of the contact detection electrode varies, so that current in a detection circuit of the movable electric device varies. A control circuit of the movable electric device triggers a prompt apparatus of the movable electric device according to the variation in the resistance value, capacitance value or impedance value of the contact detection electrode, or according to the variation in the current value (or the value of current) in the detection circuit. The prompt apparatus may send out an alert to the outside via one or more of light, sound and vibration. Of course, in some embodiments, the prompt apparatus may also send a signal to a designated terminal and send a prompt through this terminal.

Of course, if the movable electric device itself has the function of cleaning up diffusible dirt, the movable electric device switches the cleaning device to a cleaning tool for diffusible dirt to remove the diffusible dirt. When the movable electric device itself does not have the function of cleaning up diffusible dirt, the movable electric device stops moving to avoid diffusion of the dirt and contaminating the ground to be cleaned. It is worth noting that, diffusible dirt usually has a humidity and viscosity, and is prone to diffuse along with carriers, such as animal excrements, melted candies, liquids (e.g., water), flowable media (e.g., tomato sauce, soup) and the like.

The specific structure of the movable electric device will be mainly described below.

Figure 2:
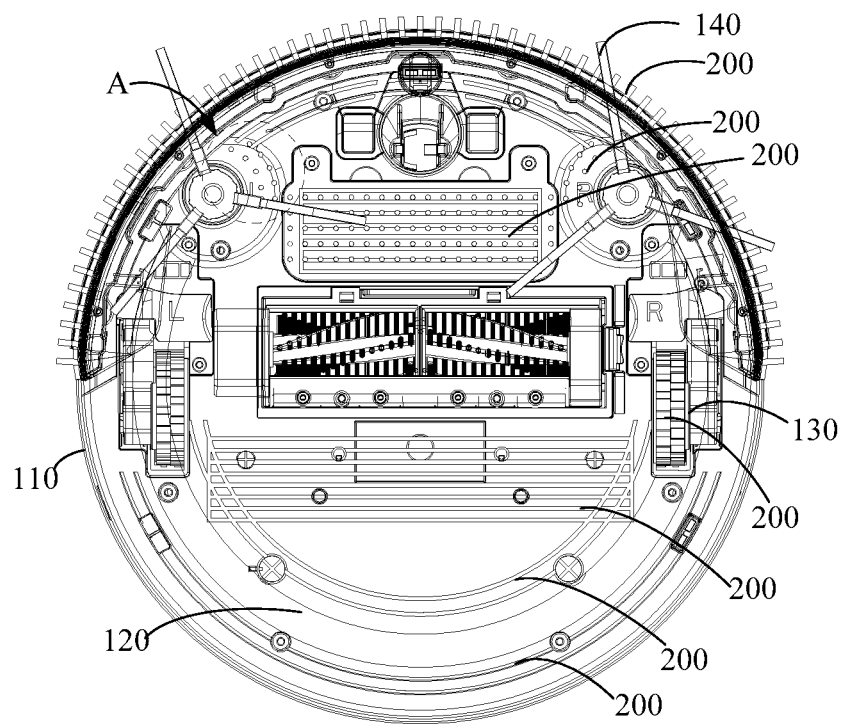
FIG. 2 is a schematic structural diagram of a bottom perspective of FIG. 1.
Figure 3:
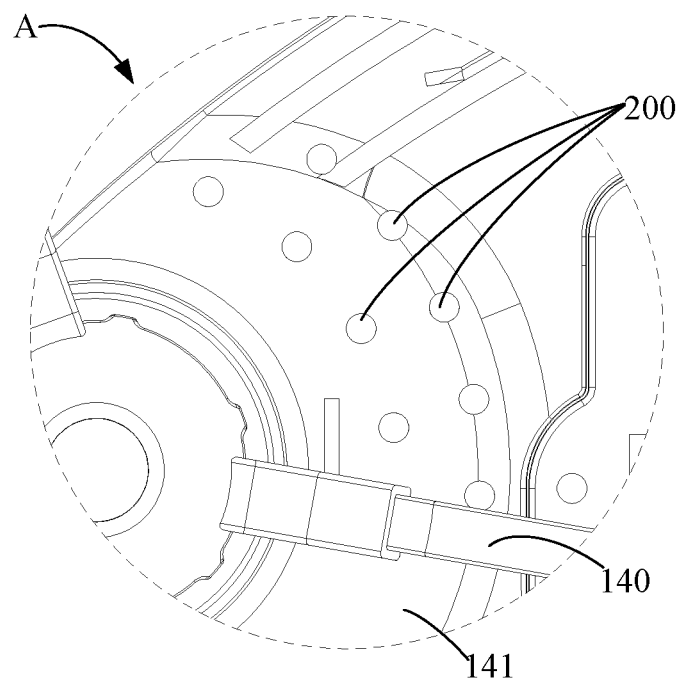
FIG. 3 is a partially enlarged diagram taken from and marked by a circle A in FIG. 2.
Figure 4:
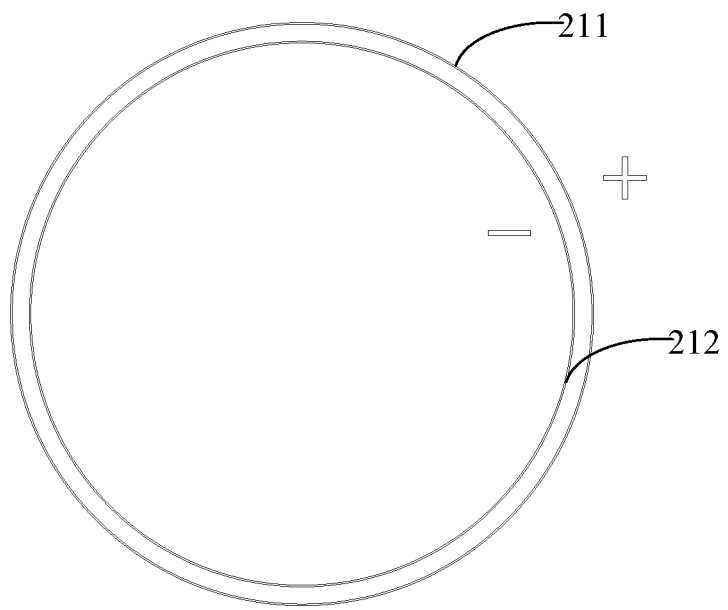
FIG. 4 is a schematic structural diagram of an embodiment of a contact detection electrode of a movable electric device according to the present disclosure.

With reference to FIGS. 1 to 3, in the embodiments of the present disclosure, a movable electric device is configured to detect or clean up wastes. The movable electric device has a movable device body 100 including an electric drive means or an electric actuator. The electric drive means may be a motor, an electrically driven hydraulic pump or pneumatic pump, electromagnetic-induction drive equipment, or any other devices driven by electricity. The movable electric device further includes a contact detection electrode 200 which is mounted on the movable device body 100. When the contact detection electrode 200 contacts diffusible dirt, a resistance, capacitance, or impedance of the contact detection electrode 200 varies.

The movable device body 100 includes a housing 110 and a roller 130 or a wheel 130. The roller 130 is disposed at a bottom portion of the housing 110 and is rotatably connected to the housing 110. The electric drive means is connected to the roller 130 to drive the roller 130 to roll. The electric drive means is connected to the housing 110. The housing 110 can have many shapes, such as polygon, ellipse, circle, etc. In the case of a same volume, in order to enable the movable electric device to enter a narrower space, the housing 110 is configured to be circular. In order to prevent external environmental factors from affecting the rolling of the roller 130, a first baffle 170 is provided on a side of the roller 130 in an axial direction of the roller 130, and a second baffle 160 is provided on a top portion of the roller 130. A bottom portion of the housing 110 is provided with a chassis 120 (the chassis 120 does not belong to the housing 110), or the bottom portion of the housing 110 is the chassis 120, that is, the chassis 120 is a part of the housing 110.

A rolling brush 150 for cleaning up ground dusts and the like is mounted on the housing 110, and is driven by a motor. In the present embodiment, a side brush 140 is also provided on the chassis 120. The side brush 140 extends from the chassis 120 out of the housing 110 to expand the cleaning range of the movable electric device, and improving the cleaning efficiency.

In the present embodiment, during the movement of the movable electric device, after an object contacts the contact detection electrode 200 and enters a detection area of the contact detection electrode 200, a capacitance value, resistance value or impedance value of the contact detection electrode 200 varies, so that current in the detection circuit where the contact detection electrode 200 lies varies. According to the variation in the capacitance value, resistant value or impedance value of the contact detection electrode 200 or the variation in the current in the detection circuit, it is judged whether the currently detected object is diffusible dirt. Since the contact detection electrode 200 directly contacts the object for detection, numerous factors that affect the detection accuracy are accordingly avoided, so that the accuracy of the detection results is greatly improved, and facilitating the improvement of an accuracy with which the movable electric device detects the diffusible dirt and facilitating an accurate judgment and operation of the movable electric device.

It is worth noting that, judging whether the currently detected object is diffusible dirt according to the capacitance value, resistance value, impedance value or current value can be achieved by a comparison circuit. For example, a preset capacitance value is configured; and when the detected capacitance value is greater than or equal to the preset capacitance value, the current object is judged to be diffusible dirt, and when the detected capacitance value is smaller than the preset capacitance value, the current object is judged to be non-diffusible dirt. Said judging whether the currently detected object is diffusible dirt according to the capacitance value, resistance value, impedance value or current value can also be realized by software. For example, the detected capacitance value may be compared with a capacitance value pre-stored in a memory of the movable electric device. Different capacitance values that are stored correspond to different types of objects. One or more of the objects are certainly diffusing dirt.

The contact detection electrode 200 may be provided in any of such positions as a peripheral side wall of the housing 110, the chassis 120, the roller 130, the first baffle 170, the second baffle 160, the side brush 140, and the rolling brush 150 etc. Some specific forms of the contact detection electrode 200, specific positions where the contact detection electrode 200 is arranged, electrode forms at the specific positions, and the like will be In one embodiment introduced below.

Firstly, specific structures of several contact detection electrodes 200 are introduced.

With reference to 4, a ring-shaped contact detection electrode 200 is shown. The contact detection electrode 200 includes a ring-shaped positive electrode 211 and a ring-shaped negative electrode 212. The ring-shaped negative electrode 212 is sleeved at an outer side of the ring-shaped positive electrode 211. In one embodiment, the ring-shaped negative electrode 212 is disposed inside the ring-shaped positive electrode 211. A detection area is formed between the ring-shaped positive electrode 211 and the ring-shaped negative electrode 212.

In one embodiment, in the present embodiment, the ring-shaped positive electrode 211 is configured to be in a ring shape. Multiple ring shapes may be adopted. For example, the ring-shaped positive electrode 211 is configured in a circle, an ellipse, a triangle, a square, or other polygon. The ring shape herein can be a complete closed ring, and can also be a ring with a small-sized opening. That is, the ring shape describes an extending tendency of the electrode. Likewise, the ring-shaped negative electrode 212 is also configured to be in a ring shape; and its shape can be a circle, an ellipse, a triangle, a quadrangle, or the like. The shape of the ring-shaped negative electrode 212 can be equivalent to that of the ring-shaped positive electrode 211, or can be completely different therefrom. The ring-shaped negative electrode 212 may be configured to be sleeved at the outside of the ring-shaped positive electrode 211, or may be mounted within an area enclosed by the ring-shaped positive electrode 211. A separation area is provided between the ring-shaped positive electrode 211 and the ring-shaped negative electrode 212. The separation area functions as a detection area of the contact electrode. When an object enters the detection area, a resistance, capacitance or impedance of the contact detection electrode 200 varies. The main control circuit of the movable electric device acquires the parameter variation, and judges whether the object is diffusible dirt according to the variation.

Figure 5:
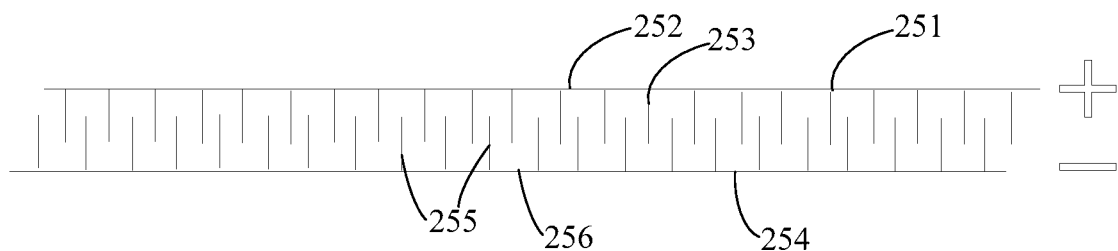
FIG. 5 is a schematic structural diagram of another embodiment of a contact detection electrode of a movable electric device according to the present disclosure.

With reference to FIG. 5, a comb-teeth shaped electrode is shown. The contact detection electrode 200 includes a comb-teeth positive electrode 251 and a comb-tooth negative electrode 254. The comb-teeth positive electrode 251 includes a positive electrode connecting arm 252 and positive electrode teeth 253 arranged along a length direction of the positive electrode connecting arm 252.

The comb-tooth negative electrode 254 includes a negative electrode connecting arm 256 and negative electrode teeth 255 arranged along a length direction of the negative electrode connecting arm 256.

The positive electrode teeth 253 and the negative electrode teeth 255 are arranged in a staggered manner to form a detection area between the positive electrode teeth 253 and the negative electrode teeth 255.

The positive electrode teeth 253 of the comb-teeth positive electrode 251 are configured in an elongate-strip shape. One end of the positive electrode teeth 253 is connected to the positive electrode connecting arm 252, and the other end thereof extends in a direction away from the positive electrode connecting arm 252. The positive electrode teeth 253 and the connecting arm are configured at an included angle between 30° and 150°. The positive electrode teeth 253 and the positive electrode connecting arm 252 being perpendicular to each other is taken as an example. The positive electrode teeth 253 can be arranged on a same side of the positive electrode connecting arm 252 or on two opposite sides of the connecting arm 252. Of course, in some embodiments, the positive electrode teeth 253 may also be arranged along a peripheral direction of the connecting arm. The positive electrode teeth 253 and the positive electrode connecting arm 252 may be configured integrally or separately.

Similarly, the negative electrode teeth 255 of the comb-teeth negative electrode 254 are configured in an elongate-strip shape. One end of the negative electrode teeth 255 is connected to the negative electrode connecting arm 256, and the other end thereof extends in a direction away from the negative electrode connecting arm 252. The negative electrode teeth 253 and the connecting arm are configured at an included angle between 30° and 150°. The negative electrode teeth 253 and the negative electrode connecting arm 256 being perpendicular to each other is taken as an example. The negative electrode teeth 255 can be arranged on a same side of the negative electrode connecting arm 256 or on two opposite sides of the connecting arm. Of course, in some embodiments, the negative electrode teeth 252 may also be arranged along a peripheral direction of the negative electrode connecting arm 256. The negative electrode teeth 255 and the negative electrode connecting arm 256 may be configured integrally or separately.

The positive electrode connecting arm 252 and the negative electrode connecting arm 256 are configured in parallel. The positive electrode teeth 253 extend toward the negative electrode connecting arm 256. The negative electrode teeth 255 extend toward the positive electrode connecting arm 252. The positive electrode teeth 253 and the negative electrode teeth 255 are arranged in a spaced and staggered manner. A detection area is formed between the positive electrode teeth 253 and the negative electrode teeth 255. When the positive electrode teeth 253 or the negative electrode teeth 255 are arranged in multiple directions of the positive electrode connecting arm 252 and the negative electrode connecting arm 256, a comb-teeth positive electrode 251 mates with comb-teeth negative electrodes 254, and a comb-teeth negative electrode 254 mates with comb-teeth positive electrodes 251.

Figure 6:
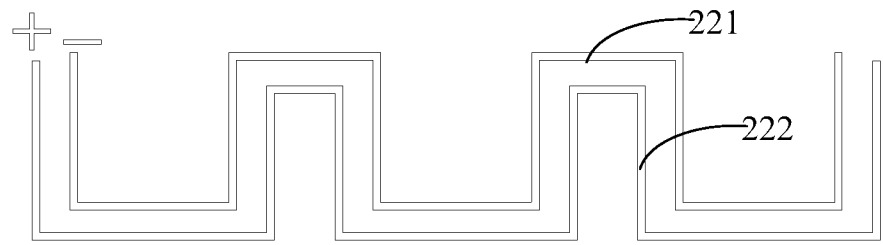
FIG. 6 is a schematic structural diagram of yet another embodiment of a contact detection electrode of a movable electric device according to the present disclosure.

With reference to FIG. 6, a curvilinear electrode is shown. The contact detection electrode 200 includes a curvilinear positive electrode 222 and a curvilinear negative electrode 221. The curvilinear positive electrode 222 bends and extends in a direction. The curvilinear negative electrode 221 extends along a length direction of the curvilinear positive electrode 222 to form a detection area between the curvilinear positive electrode 222 and the curvilinear negative electrode 221.

In one embodiment, in the present embodiment, the curvilinear positive electrode 222 is configured in a curved linear shape, and its extending direction can be configured according to actual demand. That is, the extending direction of the curvilinear positive electrode 222 can be in the shape of a preset equation curve, such as a sine curve, a cosine curve, a parabola, a normal distribution curve, or the like. The curvilinear positive electrode 222 may also extend in a square wave, and can also be configured in a wave-folded line or a wave polyline. Likewise, the curvilinear negative electrode 221 is configured in a curved linear shape, and its extending direction can be configured according to actual demand. That is, the extending direction of curvilinear negative electrode 221 can be in the shape of a preset equation curve, such as a sine curve, a cosine curve, a parabola, a normal distribution curve, or the like. The curvilinear negative electrode 221 may also extend in a square wave, and can also be configured in a wave-folded line. In one embodiment, the curvilinear positive electrode 222 extends in the form of one or more of a sine curve, a cosine curve, and a square wave curve, and/or the curvilinear negative electrode 221 extends in the form of one or more of a sine curve, a cosine curve, and a square wave curve. The curvilinear positive electrode 222 and the curvilinear negative electrode 221 are configured in parallel, and a detection area is enclosed and formed between the curvilinear positive electrode 222 and the curvilinear negative electrode 221. The shape of the curvilinear positive electrode 222 and the shape of the curvilinear negative electrode 221 can be identical or different. The shapes of the curvilinear positive electrode 222 and the curvilinear negative electrode 221 being identical is taken as an example.

Figure 7:
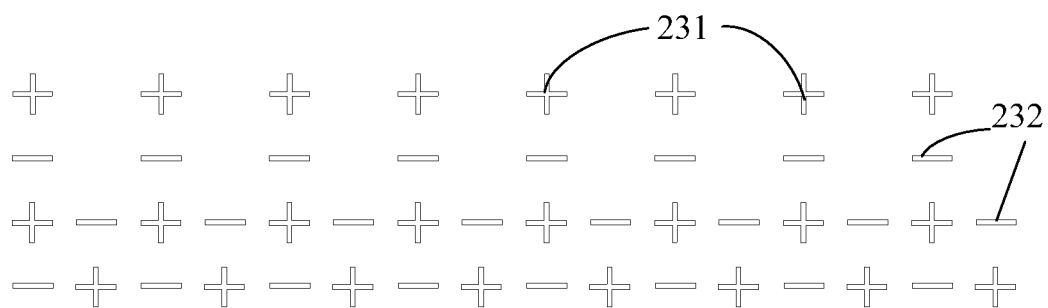
FIG. 7 is a schematic structural diagram of still another embodiment of a contact detection electrode of a movable electric device according to the present disclosure.

With reference to FIG. 7, a dot matrix electrode is shown. The contact detection electrode 200 includes positive electrode points 231 and negative electrode points 232. The positive electrode points 231 and the negative electrode points 232 are arranged in a staggered manner. A detection area is formed between the positive electrode points 231 and the negative electrode points 232.

In one embodiment, in the present embodiment, the positive electrode and the negative electrode of the contact detection electrode 200 are arranged in a dot shape. Positive electrode points 231 and negative electrode points 232 may be arranged in a desired shape, for example, a straight line, a curve, a circle, an ellipse, a polygon (a triangle, a rhombus, etc.), or the like, according to actual operating conditions. The positive electrode points 231 and the negative electrode points 232 have such small volumes that a shape in which the positive electrode points 231 and the negative electrode points 232 are arranged may perfectly fit with the actually desired shape. As such, the contact detection electrode 200 may not only be arranged at any desired position to improve adaptability of the contact detection electrode 200, but also may detect positions which can hardly be detected by ordinary electrodes, and increasing the detection range of the contact detection electrode 200.

Figure 9:
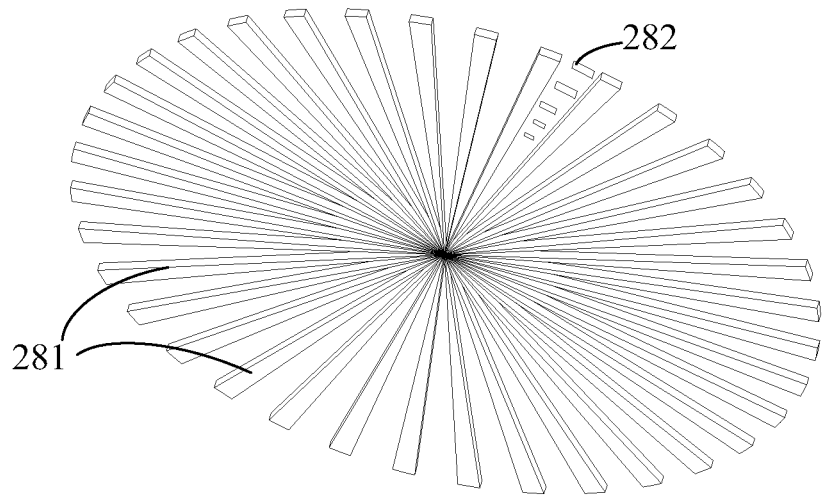
FIG. 9 is a schematic structural diagram of still another embodiment of a contact detection electrode of a movable electric device according to the present disclosure.
Figure 10:
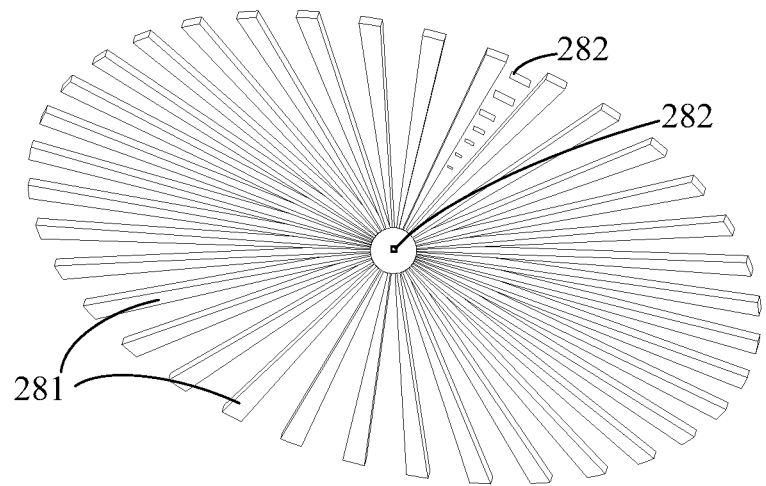
FIG. 10 is a schematic structural diagram of still another embodiment of a contact detection electrode of a movable electric device according to the present disclosure.

With reference to FIGS. 9 and 10, a star-shaped radial shape is shown. The contact detection electrode 200 includes positive electrode plates 281 and negative electrodes 282. The plurality of positive electrode plates 281 are arranged radially from the center to the periphery. The plurality of negative electrodes 282 are located in gaps between adjacent positive electrode plates 281. A detection area is formed between the positive electrode plates 281 and the negative electrodes 282.

In one embodiment, the contact detection electrode 200 includes negative electrode 282 plates and positive electrodes. The plurality of negative electrode 282 plates are arranged radially from the center to the periphery. The plurality of positive electrodes are located in gaps between the adjacent negative electrode 282 plates. A detection area is formed between the negative electrode 282 plates and the positive electrodes.

In one embodiment, in the present embodiment, the positive electrode plates 281 are configured in an elongate-strip shape which can be any of an elongate rectangle, trapezoid, triangle, and the like. An end of each of the plurality of positive electrode plates 281 extends toward a same convergence point, and the other end thereof extends radially in a direction away from the convergence point. Ends of the positive electrode plates 281 adjacent to the convergence point may be connected or not connected. The connection of ends of the positive electrode plates 281 adjacent to the convergence point as an example facilitates power supply to all the positive electrode plates 281 at the same time. There is a gap between the ends of two adjacent positive electrode plates 281 away from the convergence point. The gap may be a uniform gap or a gradual gap.

The negative electrodes 282 can have a variety of forms, such as an elongate-strip shape, a block shape, a dot shape, etc. When the negative electrodes 282 are in the elongate-strip shape, the negative electrodes 282 extend along a length direction of the gap. When the negative electrodes 282 are in the block shape and the dot shape, the negative electrodes 282 are arranged in the gap. Negative electrodes 282 may be provided in a same gap. In some embodiments, ends of positive electrode plates 281 adjacent to the convergence point enclose a central area in which the negative electrodes 282 are provided.

It is worth noting that, in some embodiments, the negative electrodes 282 are arranged radially in a star shape, and the positive electrodes are embedded in the gaps between the adjacent negative electrodes 282.

In order to improve the detection efficiency and detection accuracy of the contact detection electrode 200, when the positive electrode plates 281 are arranged radially, the negative electrodes 282 are arranged in a circle with a radiation center of the positive electrode plates 281 as a center of the circle.

When the negative electrodes 282 plates are arranged radially, the positive electrodes are arranged in a circle with a radiation center of the negative electrodes 282 plates as a center of the circle.

With the radial arrangement of the positive electrode plates 281 as an example, the negative electrodes 282 are arranged in the gaps between the adjacent positive electrodes, and the negative electrodes 282 in different gaps are arranged in a ring shape. The convergence point is the center of the ring shape. As such, the negative electrodes 282 are arranged in such a regular and reasonable manner that the detection area between the negative electrodes 282 and the positive electrode plates has a moderate area, and guaranteeing accurate detection of the contact electrode and an effective area of the detection area.

Figure 8:
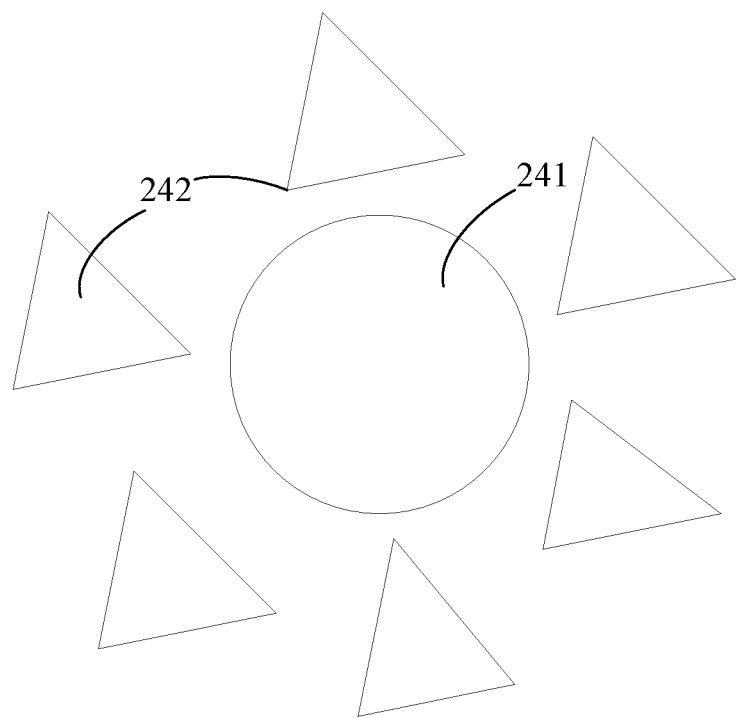
FIG. 8 is a schematic structural diagram of still another embodiment of a contact detection electrode of a movable electric device according to the present disclosure.

With reference to FIG. 8, a central electrode is shown. The contact detection electrode 200 includes a central positive electrode 241 and negative electrodes 242 arranged circumferentially around the central positive electrode 241. A detection area is formed between the central positive electrode 241 and the negative electrodes 242. Or the contact detection electrode 200 includes a central negative electrode 242 and positive electrodes arranged circumferentially around the central negative electrode 242. A detection area is formed between the central negative electrode 242 and the positive electrodes.

In one embodiment, in the present embodiment, the central positive electrode 241 is located in the middle, and the negative electrodes 242 are provided around the middle. The number of negative electrodes 242 may be one or plural. Negative electrodes 242 are arranged surrounding the central positive electrode 241. The number of negative electrodes 242 is related to the area of the positive electrode. The larger the area facing the negative electrodes 242, the greater the number of negative electrodes 242 that can be matched with the positive electrode 241 at the same time. The negative electrodes 242 radiate to a periphery of the central positive electrode 241, with the central positive electrode 241 as the center. The shapes of the central positive electrode 241 and the negative electrodes 242 are not limited herein, and they can be any of a triangle, a quadrilateral and other polygon, a circle, an ellipse, and the like. Of course, in some embodiments, positive electrodes may also be arranged on the periphery of the central positive electrode 241, and cooperate with the adjacent negative electrodes 242 to form a detection area.

In some other embodiments, the negative electrode 242 is placed in the middle to form the central negative electrode 242 around which positive electrodes are provided. The number of positive electrodes can be one or plural, and the plurality of positive electrodes are arranged around the central negative electrode 242. The number of positive electrodes is related to the area of the negative electrode 242. The larger the area facing the positive electrodes, the greater the number of positive electrodes that can be matched with the negative electrode 242 at the same time. The positive electrodes 242 radiate to a periphery of the central negative electrode 242, with the central negative electrode 242 as the center. The shapes of the central negative electrode 242 and the positive electrodes are not limited herein, and they can be any of a triangle, a quadrilateral and other polygon, a circle, an ellipse, and the like. Of course, in some embodiments, negative electrodes 242 may also be arranged on the periphery of the central negative electrode 242, and cooperate with the adjacent positive electrodes to form a detection area.

In order to improve the adaptability of the contact electrode, the contact detection electrode 200 includes a positive electrode and a negative electrode. A thickness of the positive electrode is greater than that of the negative electrode. In one embodiment, the thickness of the negative electrode is greater than that of the positive electrode.

In the present embodiment, when the contact detection electrode 200 is mounted on the movable device body 100, contour surfaces of some mounting positions are uneven, thus after the electrode is mounted, an end of the electrode away from the movable device body 100 is uneven, resulting in a low detection accuracy (there is a case when only a single electrode contacts the detected object). In this case, it is needed to adjust the thickness of the electrode to compensate for the detection accuracy problem caused by the unevenness of the contour surfaces. A positive electrode or a negative electrode with a relatively small thickness is correspondingly adopted for a convex contour surface, and a negative electrode or a positive electrode with a relatively great thickness is adopted for a concave contour surface, so that ends of the paired positive electrode and negative electrode away from the movable device body 100 are flush with each other.

In order to improve the detection effect of the contact detection electrode 200 or prolong its service life, the contact detection electrode 200 includes a positive electrode and a negative electrode. The positive electrode and/or the negative electrode have pointed teeth or sharp teeth. In one embodiment, the positive electrode and/or the negative electrode have arc-shaped transitions.

When the positive electrode or the negative electrode has pointed teeth, the pointed teeth are more likely to adhere to the dirt to be detected, which is conducive to improving the detection accuracy. There are many shapes with pointed teeth, such as a triangle, a trapezoid, and the like. When the positive electrode or the negative electrode has an arc-shaped transition, it is possible to prevent the electrode from being scratched during the detection process. The arc shape of the arc-shaped transition can have various forms, for example, a circular arc.

In order to adapt to different working environments, there are multiple groups of contact detection electrodes 200, where at least one group of the contact detection electrodes 200 has a thickness greater than that of the other contact detection electrodes 200. Thicknesses of the multiple groups of contact detection electrodes 200 may all be different, or some of them may be identical. The contact detection electrodes 200 of different thicknesses are mounted on the movable device body 100 according to requirements of different operating conditions. In some embodiments, the contact detection electrodes 200 are arranged and the thickness thereof gradually increases along an extending direction from the edge to the middle of the movable device body 100. The movable electric device can thus detect contaminants in different situations, which is conducive to improving the adaptability of the contact detection electrode 200.

In some embodiments, in order to extend the service life of the contact detection electrode 200, the contact detection electrode 200 is configured as a flexible electrode. The contact detection electrode 200 includes a positive electrode and a negative electrode. The positive electrode and the negative electrode have flexibility. A length of the positive electrode and the negative electrode is smaller than a half of the distance between the adjacent positive electrode and negative electrode. During the process of detecting dirt, if the flexible electrode collides with a rigid object, its shape will be elastically deformed. After the collision ends, the electrode will restore to its original shape under the action of an elastic restoring force. This process will repeat. Since the contact detection electrode 200 is flexible, it would not be easily damaged, and facilitating the extension of its service life.

The contact detection electrodes 200 mounted in different positions will be described below.

Figure 11:
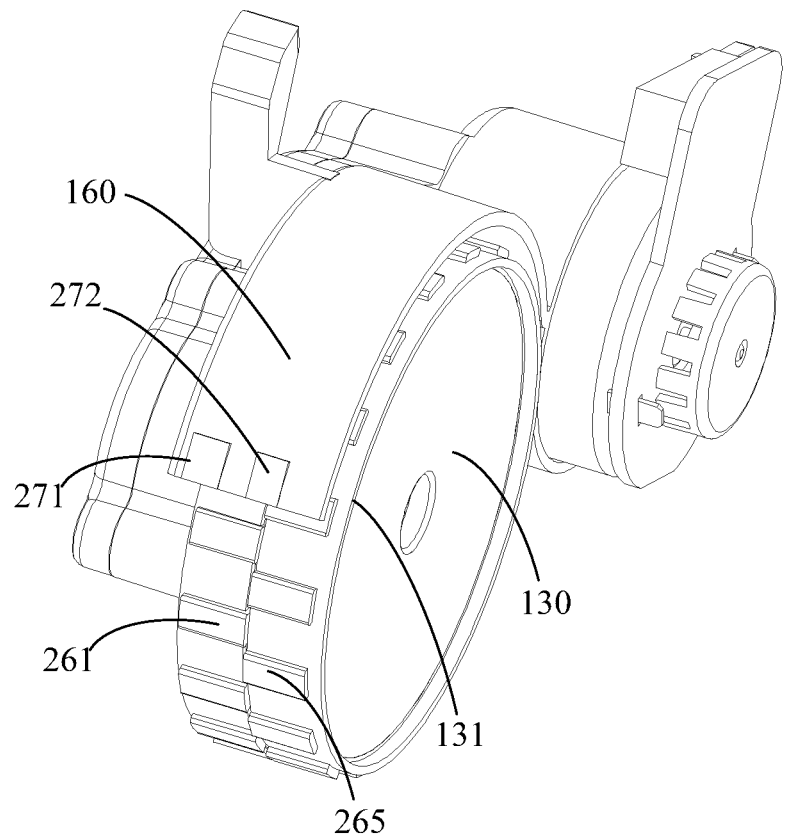
FIG. 11 is a schematic structural diagram of a roller of a movable electric device according to the present disclosure.
Figure 12:
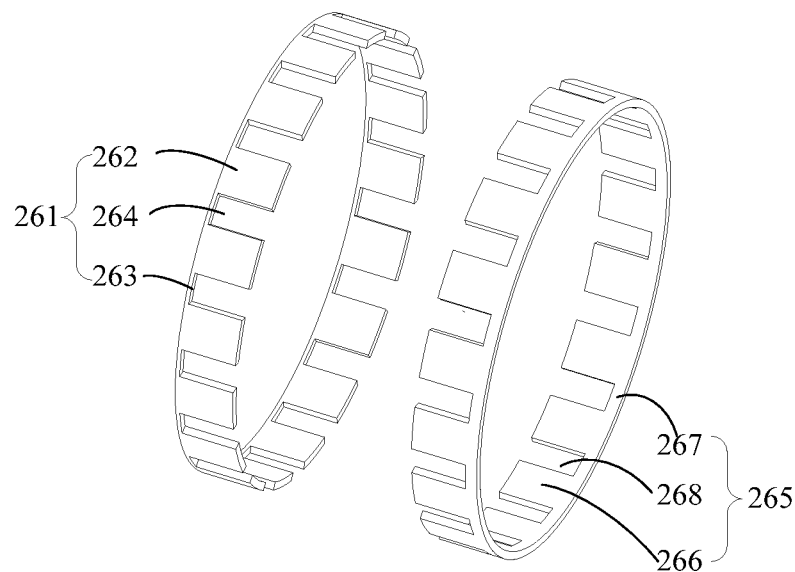
FIG. 12 is a schematic structural diagram of a contact detection electrode mounted on a roller of a movable electric device according to the present disclosure.

With reference to FIGS. 11 and 12, the contact detection electrode 200 is mounted on a roller 130. The movable device body 100 includes a housing 110 and a roller 130. The roller 130 is provided at a bottom portion of the housing 110. The contact detection electrode 200 is provided on an outer peripheral surface 131 and/or side portion of the roller 130.

In one embodiment, in the present embodiment, the contact detection electrode 200 may be mounted on the outer peripheral surface 131 of the roller 130 or on a axial side of the roller 130. There are many ways for the contact detection electrode to be mounted on the roller 130, for example, through a buckle, a screw, a slot, glue, etc. In one embodiment, the contact detection electrode can be directly embedded in the roller 130. Regarding the arrangement of the contact detection electrodes 200 on the roller 130, there can be many forms. For example, contact detection electrodes 200 are arranged along a peripheral direction of the roller 130, so that detection can be carried out at any position of the roller 130, which is conducive to improving the detection efficiency and accuracy. Of course, in some embodiments, the peripheral direction of the roller 130 is divided into several areas. Contact detection electrodes 200 are provided within each of these areas to detect dirt in the respective areas.

In order to further improve the mounting and dismounting efficiency of the contact detection electrode 200, the contact detection electrode 200 includes a positive electrode 261 and a negative electrode 265. The positive electrode 261 includes positive electrode plates 262 connected by a positive electrode connector 263, and there is a positive electrode gap 268 between the two adjacent positive electrode plates 262. The negative electrode 265 includes negative electrode plates 266 connected by a negative electrode connector 267, and there is a negative electrode gap 268 between the two adjacent negative electrode plates 266. The positive electrode 261 and the negative electrode 265 are arranged in parallel. Further, the positive electrode plates 262 are configured to correspond to the negative electrode gaps 268, and the negative electrode plates 266 are configured to correspond to the positive electrode gaps 268.

In one embodiment, in the present embodiment, the positive electrode 261 includes positive electrode plates 262 which can be connected to each other through a positive electrode connector 263 or may be arranged independently of each other. Likewise, the negative electrode 265 includes negative electrode plates 266 which can be connected to each other through a negative electrode connector 267 or may be arranged independently of each other. The positive electrode connector 263 connecting the positive electrode plates 262 is provided at an end of the positive electrode plates 262 or in the middle of the positive electrode plates 262. That the positive electrode plates 262 are provided on the same side of the positive electrode connector 263 is taken as an example. A width of the positive electrode gap 268 is slightly larger than a width of the negative electrode plates 266, and a width of the negative electrode gap 268 is slightly wider than a width of the positive electrode plates 262. There are gaps between the positive electrode plates 262 and the negative electrode plates 266. The negative electrode connector 267 connecting the negative electrode plates 266 is provided at an end of the negative electrode plates 266 or in the middle of the negative electrode plates 266. That the negative electrode plates 266 are provided on the same side of the negative electrode connector 267 is taken as an example. In some implementations, the plurality of positive electrode plates 262 and the positive electrode connector 263 are integrally configured, and the plurality of negative electrode plates 266 and the negative electrode connector 267 are integrally configured.

In the present embodiment, the positive electrode 261 and the negative electrode 265 are each arranged in a ring shape, and the positive electrode 261 and the negative electrode 265 are provided around the outer peripheral surface 131 of the roller 130 along the peripheral direction of the roller 130. There are many ways to provide the positive electrode 261 and the negative electrode 265 along the outer peripheral surface 131 (circumferential surface) of the roller 130. In the present embodiment, both the positive electrode 261 and the negative electrode 265 are configured to sleeve the same roller 130. With rolling of the roller 130, different positive electrode plates and negative electrode plates 266 successively contact the ground. The positive electrode 261 and the negative electrode 265 each covers one of the two sides of the outer peripheral surface 131 of the roller 130. By providing the positive electrode 261 and the negative electrode 265 in a ring shape, the mounting and dismounting of the positive electrode 261 and the negative electrode 265 is more convenient.

The contact detection electrode 200 is mounted on the first baffle 170 of the roller 130. In some embodiments, the movable device body 100 includes a first baffle 170 provided on an axial side of the roller 130, and the contact detection electrode 200 is provided on the first baffle 170. The contact detection electrode 200 can be mounted on a side of the first baffle 170 facing the roller 130 or on a side of the first baffle 170 facing away from the roller 130. The positive electrode and the negative electrode of the contact detection electrode 200 are arranged along a front-rear direction of the first baffle 170. Of course, in some embodiments, the contact detection electrode 200 is mounted at a bottom portion of the first baffle 170. In this case, there is a distance between the first baffle 170 and the bottom portion of the roller 130, this distance is greater than the thickness of the contact detection electrode 200. That is, a gap is guaranteed to remain between the contact detection electrode and the ground, to avoid a direct friction of the contact detection electrode 200 with the ground.

In some embodiments, the positive electrode and the negative electrode of the contact detection electrode 200 can be mounted on the roller 130 and the first baffle 170 respectively. The contact detection electrode 200 includes a positive electrode and a negative electrode. A side of the first baffle 170 facing the roller 130 is provided with a positive electrode and/or a negative electrode, and a side of the roller 130 facing the first baffle 170 is provided with a negative electrode and/or a positive electrode. That is, in this case, the detection area further includes a detection area formed by the positive electrode located on the roller 130 or the first baffle 170 and the negative electrode located on the first baffle 170 or the roller 130, in addition to an area formed by the positive and negative electrodes on the axis sides of the roller 130 and an area formed by the positive and negative electrodes on the first baffle.

In some embodiments, the first baffle 170 not only blocks external interference with the roller 130, but also provides support for a rotating shaft of the roller 130. The rotating shaft of the roller 130 is rotatably connected to the first baffle 170. In the present embodiment, an end of the rotating shaft of the roller 130 is connected to a motor, and the other end thereof is inserted into a shaft hole in the first gear.

In some embodiments, in order to reduce the friction between the contact detection electrode and the ground, the peripheral side wall of the roller is provided with a mounting cavity. The contact detection electrode is mounted in the mounting cavity. A top portion of the contact detection electrode is flush with an opening of the mounting cavity or lower than an edge of the opening. When the top portion of the contact detection electrode is flush with the opening of the mounting cavity, the contact detection electrode and the peripheral side wall of the roller contact the ground together, the friction is relatively small. When the top portion of the contact detection electrode is lower than the edge of the opening of the mounting cavity, the contact detection electrode does not directly contact the ground, while only the peripheral side wall of the roller directly contacts the ground. As a result, the contact detection electrode has no friction force, which is conducive to improving the service life of the contact detection electrode, avoiding damage, and ensuring accuracy.

Of course, in some embodiments, the contact detection electrode can also be configured to protrude beyond the opening of the mounting cavity, so that the contact detection sensor may make an earlier contact with the object to be detected than the roller in the corresponding position, and effectively ensuring a sampling volume of the contact detection electrode and facilitating improvement of the detection efficiency.

With reference to FIG. 12, the contact detection electrode 200 is mounted on a second baffle 160. The movable device body 100 includes a second baffle 160 provided on an upper portion of the roller 130, and the contact detection electrode 200 is mounted on the second baffle 160. The second baffle 160 is disposed above the roller 130 and extends along the outer peripheral surface of the roller 130 to prevent the roller 130 in rotation from dumping liquid dirt onto the movable device body 100. The contact detection electrode 200 is provided at an end (a front end or a rear end) of the second baffle 160 adjacent to the roller 130. The positive electrode 271 and the negative electrode 272 of the contact detection electrode 200 can be arranged along a length direction of the second baffle 160, or along a width direction of the second baffle 160. Of course, in some embodiments, the positive electrode 271 can be mounted on the second baffle 160 or the roller 130, and the negative electrode 272 can be correspondingly mounted on the roller 130 or the second baffle 160. In one embodiment, the contact detection electrode 200 includes a positive electrode 271 and a negative electrode 272. The positive electrode 271 and/or the negative electrode 272 are mounted on the second baffle 160, and the negative electrode 272 and/or the positive electrode 271 are mounted on the roller 130. In this case, the detection area is not only formed on the contact detection electrodes 200 on the second baffle 160 and on the roller 130, but also formed on an area between the second baffle 160 and the roller 130.

In some embodiments, in order to know the position of the diffusible dirt accurately and quickly, multiple groups of contact detection electrodes 200 are provided, and are distributed at multiple positions of the movable device body 100. By configuring the contact detection electrodes 200 at different positions, when the main control circuit determines that the contact detection electrode 200 in a position has detected diffusible dirt, the position of the diffusible dirt may be determined according to the position of the corresponding contact electrode. Therefore, it is beneficial for the main control circuit to control movement of the movable electric device to avoid the movement of the dirt, and avoiding diffusion of the diffusible dirt.

The contact detection electrode 200 is mounted on the chassis 120. The movable device body 100 includes a chassis 120 on which the contact detection electrode 200 is provided.

Figure 13:
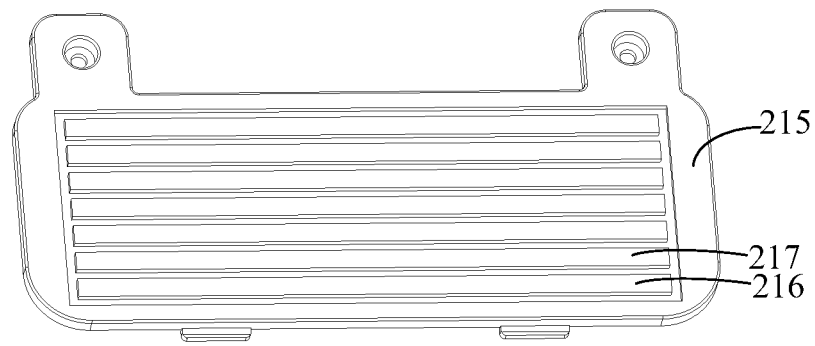
FIGS. 13 to 14 are schematic structural diagrams of a contact detection electrode mounted on a chassis of a movable electric device according to the present disclosure.
Figure 14:
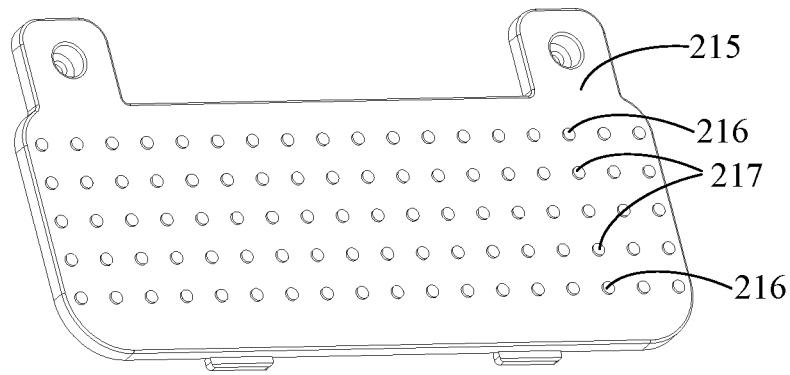
Figure 15:
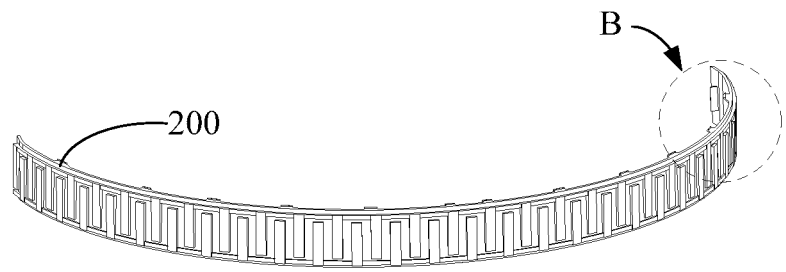
FIGS. 15-22 are schematic structural diagrams of a contact detection electrode mounted on a housing of a movable electric device according to the present disclosure.
Figure 16:
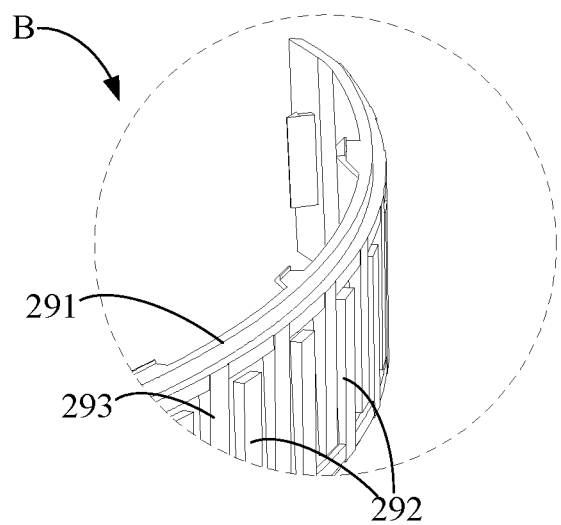
Figure 17:
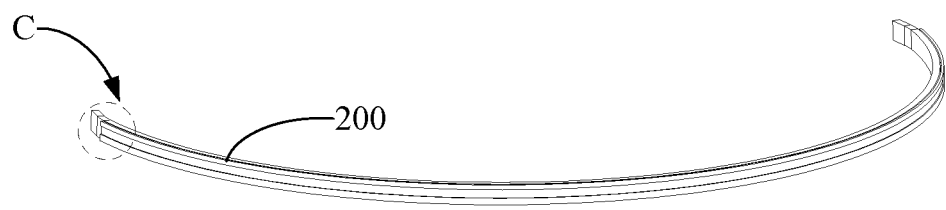
Figure 18:
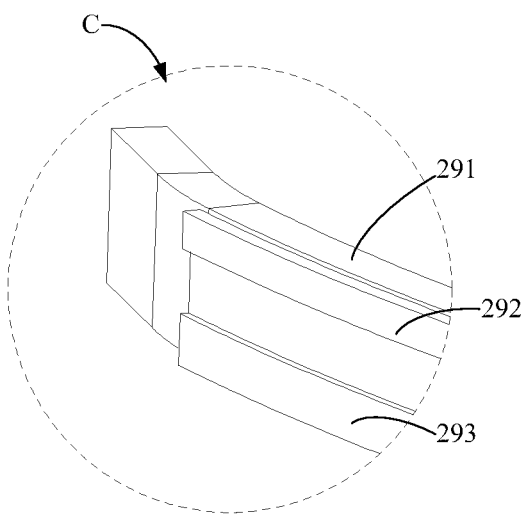
Figure 19:
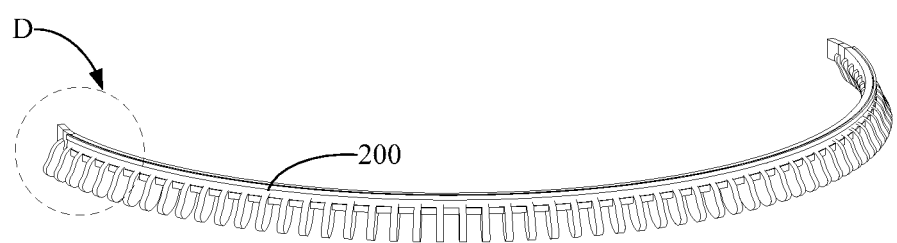
Figure 20:
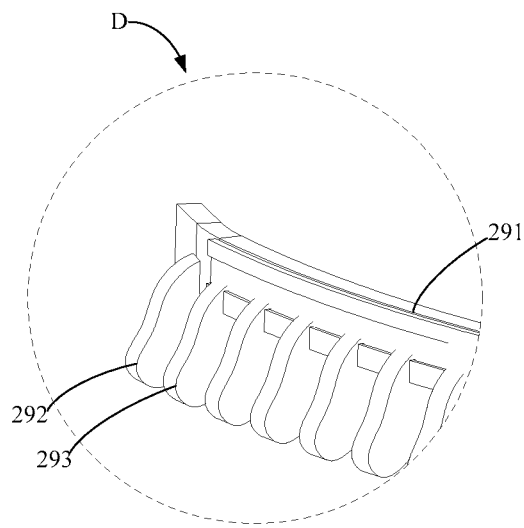
Figure 21:
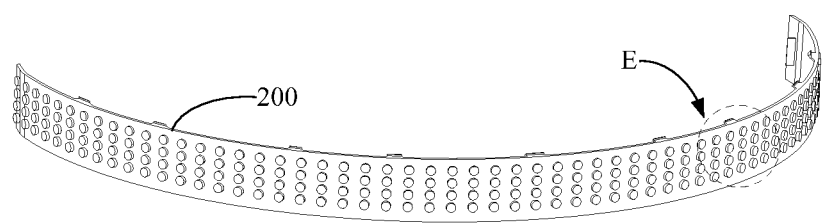
Figure 22:
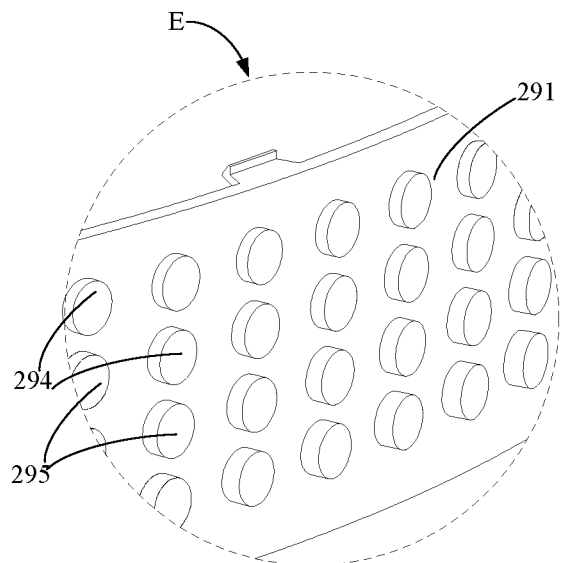

With reference to FIGS. 13 and 14, in the present embodiment, the chassis 120 is located at a bottom portion of the movable device body 100, and the shape and structure of the chassis 120 are configured as required. The chassis 120 is provided with an opening through which the rolling brush 150 operates, and the opening is located in the middle of the chassis 120. Of course, in other embodiments, the position of the opening can be configured according to actual conditions. Two rollers 130 are located on two ends of the opening respectively. That is, two rollers 130 are located on two sides of the rolling brush 150.

There are many positions on the chassis 120 where the contact electrodes can be provided, such as any of the front, rear, left, right, and middle portion of the chassis 120. There are also many manners of mounting the contact detection electrodes 200, for example, through a buckle, a screw, gluing or the like. In one embodiment, a mounting slot can also be provided on the chassis 120 to mount the electrode within the mounting slot. Of course, in some embodiments, it is also possible to mount the electrode on another component, and then to mount the component on the chassis 120. In one embodiment, the following embodiment may be referred to.

In order to facilitate mounting and maintenance of the contact detection electrode 200, the contact detection electrode 200 includes an insulating substrate 215, and a substrate positive electrode 216 and a substrate negative electrode 217 which are mounted on the insulating substrate 215. A detection area is formed between the substrate positive electrode 216 and the substrate negative electrode 217. In the present embodiment, the substrate positive electrode 216 and the substrate negative electrode 217 are mounted on an insulating substrate 215, and then the substrate and the chassis 120 are configured to be detachably connected. Therefore, mounting and dismounting of the substrate positive electrode 216 and the substrate negative electrode 217 and the chassis 120 are converted to mounting and dismounting of the insulating substrate 215 and the chassis 120. Since the insulating substrate 215 is an independent component, it can be automatically manufactured together with the substrate positive electrode 216 and the substrate negative electrode 217, which is conducive to simplifying the mounting of the substrate positive electrode 216 and the substrate negative electrode 217 and improving the mounting accuracy thereof.

Regarding the form of the substrate positive electrode 216 and the substrate negative electrode 217, the above embodiments can be referred to. All embodiments where mounting can be carried out through the insulating substrate 215, such as dot matrix electrodes, star-shaped radiation electrodes, central electrodes, curvilinear electrodes, comb-teeth electrodes and the like can be implemented in the present embodiment.

Figure 23:
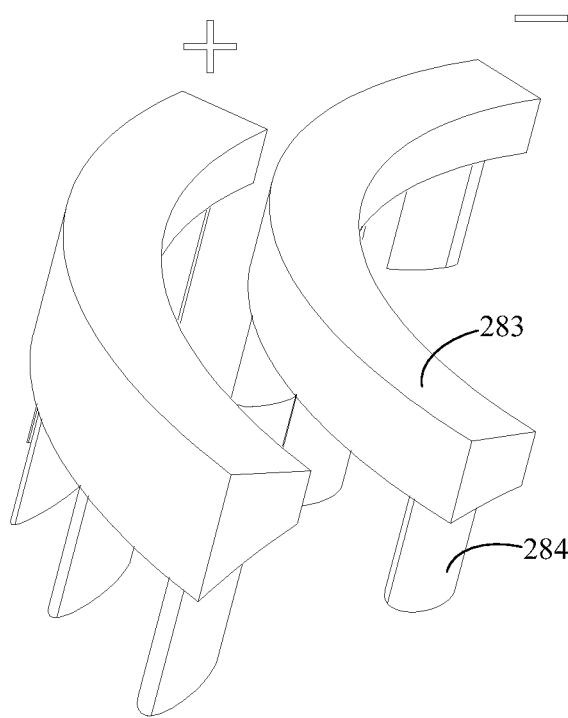
FIG. 23 is a schematic structural diagram of an embodiment of a contact detection electrode.
Figure 24:
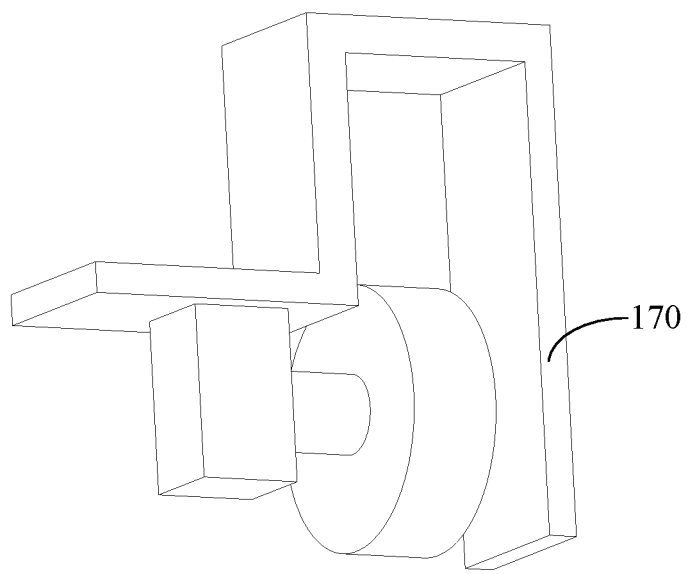
FIG. 24 is a schematic structural diagram of a roller and a first baffle.

With reference to FIG. 23, in some embodiments, in order to improve the mounting stability of the contact electrode, the contact detection electrode 200 includes a fixing part 283 and a detecting part 284 connected to the fixing part 283. The fixing part 283 is detachably connected to the chassis 120, and the detecting part 284 extends in a direction away from the fixing part 283. The fixing part 283 is provided in an elongate-strip shape. The detecting part 284 includes detecting teeth arranged along a length direction of the fixing part 284. Polarities of the detection teeth can be identical or different. That is, the positive electrode and the negative electrode can be provided on the same fixing part 284. Of course, the electrodes can also be configured to be identical. In this case, fixing parts 283 and detecting parts 284 need to be provided to mate with each other.

In some embodiments, the contact detection electrode 200 is provided in an elongate-strip shape, and extends along a peripheral direction of the chassis 120. The contact detection electrode 200 includes a positive electrode and a negative electrode. The positive electrode and the negative electrode are provided in an elongate-strip shape. The positive electrode and the negative electrode extend along an extending direction of the edge of the chassis 120. The numbers of positive electrodes and negative electrodes can be multiple. The positive electrodes and the negative electrodes are arranged in a staggered manner.

In some embodiments, in order to improve the detection efficiency of the contact detection electrode 200, the contact detection electrode 200 is configured to be adjacent to an edge of a front side of the chassis 120. By providing the contact detection electrode 200 on the edge of the front side of the chassis 120, the electrode can not only perform detection in a wide range, but also can make contact with the object to be detected as soon as possible, to avoid the sweeping robot from damaging the object to be detected as much as possible. Meanwhile, the contact detection electrode 200 can sample the most complete sample as soon as possible for detection, and fundamentally preventing the chassis 120 from carrying the object to be detected and contaminating more places and greatly improving the detection efficiency and accuracy. The edge of the front side of the chassis 120 is configured in an arc shape, and the contact detection electrode 200 is also configured in an arc shape to detect the object to be detected in the maximum range.

With reference to FIGS. 1 to 3, the contact detection electrode is mounted at a position adjacent to the side brush 140. The movable device body 100 includes a side brush 140. A mounting platform 141 of the side brush 140 protrudes outward, and the contact detection electrode 200 is provided on the mounting platform 141. The side brush 140 includes a rotating shaft and a brush body provided on the rotating shaft. The number of brush bodies can be plural, for example, three. The brush bodies extend outward from the rotating shaft to the outside of the chassis 120, and rotate along with the rotating shaft.

Since the mounting platform 141 for mounting the side brush 140 protrudes beyond a surface of the chassis 120, the mounting platform is rendered more close to the ground, so that the contact detection electrode 200 on the mounting platform 141 may more easily contact the dirt to be detected. The contact detection electrode 200 provided on the mounting platform 141 can have various forms, such as a dot matrix electrode. For more details, the above-mentioned embodiments can be referred to and will not be repeated here.

In some embodiments, in order to detect dirt more accurately and quickly, the number of side brushes 140 is configured to be two. The two side brushes 140 are configured on the left and right sides of a front side of the bottom portion of the housing 110. The contact detection electrode 200 is mounted on a side of the mounting platform 141 facing the middle. By providing the side brushes 140 on the front left side and front right side of the chassis 120 respectively, the side brushes 140 can detect in advance a wide range of areas to be cleaned, to avoid the roller 130, the chassis 120, and the housing 110 from colliding with diffusible dirt. At the same time, some non-diffusible dirt is swept to the middle of the chassis 120 for further detection or clean-up by the rolling brush 150.

Of course, in some examples, the contact detection electrode 200 can be directly mounted on the side brush 140. The contact detection electrode 200, for example, a flexible electrode, is arranged in parallel with bristles on the side brush 140, and detects the dirt during operation of the side brush 140.

The contact detection electrode 200 is mounted on the rolling brush 150. The movable device body 100 includes a rolling brush 150 provided in the middle of the housing 110. The contact detection electrode 200 is mounted on the rolling brush 150. The contact detection electrode 200 is a flexible electrode. The contact detection electrode 200 is arranged in parallel with bristles of the rolling brush 150. The positive electrode and the negative electrode of the contact detection electrode 200 are arranged in a spaced manner among the bristles, and the dirt is detected along with rolling and cleaning of the rolling brush 150. Of course, in some embodiments, in order to further improve the detection accuracy, the contact detection electrode 200 on the rolling brush 150 and the contact detection electrode 200 on the side brush 140 can be provided simultaneously to ensure the detection accuracy.

With reference to FIGS. 15-22, the contact detection electrode 200 is mounted on a peripheral side wall of the housing 110. The movable device body 100 includes a housing 110. The contact detection electrode 200 is provided on a peripheral side wall of the housing 110. There are many manners of mounting the contact detection electrode 200 on the peripheral side wall, such as through a buckle, a screw, glue, slot embedding and the like. There are also many forms of contact detection electrodes 200 mounted on the peripheral side wall, and some examples are given below for description.

In order to make reasonable use of space, the contact detection electrode 200 is attached to a surface of the housing 110. The contact detection electrode 200 includes a flexible substrate 291. The positive and negative electrodes of the contact detection electrode 200 are mounted on the flexible substrate 291. The flexible substrate 291 is wound and mounted on the peripheral side wall of the housing 110. The flexible substrate 291 is configured in an elongate-strip shape. The positive and negative electrodes are arranged sequentially in a staggered manner on the surface of the flexible substrate 291, and there are gaps between the positive electrodes and the negative electrodes. A lower side of the flexible substrate 291 is provided adjacent to the chassis 120, so that the positive electrodes and the negative electrodes are more close to the ground, and facilitating the detection by the contact detection electrode 200.

There may be many forms of positive electrodes and negative electrodes. The following is an example for description. The positive electrode includes positive electrode plates, and the negative electrode includes negative electrode plates 293. The positive electrode plates and the negative electrode plates 293 are arranged sequentially in a staggered manner on the flexible substrate 291. Of course, in some embodiments, in order to electrically connect the positive electrode plates 292 together, ends of all the positive electrode plates 292 are connected together by a conductive connector. In order to electrically connect the negative electrode plates 293 together, ends of all the negative electrode plates 293 are connected together by a conductive connector. The connector connecting the positive electrode plates 292 and the connector connecting the negative electrode plates 293 are respectively located on two opposite sides of the flexible insulating substrate.

Regarding the arrangement of the positive electrode plates 292 and the negative electrode plates 293 on the flexible substrate 291, the positive electrode plates 292 and the negative electrode plates 293 extend along a length direction of the flexible substrate 291, or along a width direction of the flexible substrate 291. That is, the positive electrode plates 292 can extend along the length direction of the flexible substrate 291 or along the width direction of the flexible substrate 291. The negative electrode plates 293 and the positive electrode plates 292 are arranged in parallel. That is, the negative electrode plates 293 can extend along the length direction of the flexible substrate 291 or along the width direction of the flexible substrate 291.

In order to further increase strength of the connection of the positive electrode plates 292 and the negative electrode plates 293 with the flexible substrate 291, the positive electrode plates 292 and/or the negative electrode plates 293 are attached and fixed to the surface of the flexible substrate 291. There are many ways for attaching and fixing, for example, by glue or by slot fitting. With this arrangement, by increasing areas of the connection of the positive electrode plates 292 and the negative electrode plates 293 with the flexible substrate 291, the connection strength thereof can be increased.

In order to improve the detection accuracy of the contact detection electrode 200, an end of the positive electrode plates and/or the negative electrode plates is connected to the surface of the flexible substrate 291, and the other end thereof extends in a direction away from the flexible substrate 291. The positive electrode plates 292 and/or the negative electrode plates 293 extend toward an end away from the flexible substrate 291, so that a deeper detection area is formed between the adjacent positive electrode plates 292 and the negative electrode plates 293. Moreover, a height of the detection area (a distance from the chassis 120 or a distance from the ground) is equivalent to a height of the flexible substrate 291. In this way, the contact detection electrode 200 can increase the area of contact between the dirt and the electrode during the detection process, and effectively improving the detection accuracy.

In order to further improve the detection accuracy of the contact detection electrode 200, the flexible substrate 291 is mounted on a lower portion of the peripheral side wall of the housing 110, and the positive electrode plates and/or the negative electrode plates extend toward the bottom portion of the housing 110. By mounting the flexible substrate 291 on the lower portion of the peripheral side wall and configuring the positive electrode plates 292 and/or the negative electrode plates 293 to extend toward the bottom portion, a detection area enclosed by the positive electrode plates 292 and the negative electrode plates 293 is made more close to the chassis 120 or the bottom surface, and the area of contact with the dirt during the detection process is further increased, and efficiently improving the detection accuracy.

In order to improve the adaptability of the contact detection electrode 200, the positive electrode includes positive electrode bumps 294, and the negative electrode includes negative electrode bumps 295. The positive electrode bumps 294 and the negative electrode bumps 295 are arranged sequentially in a dot matrix. The dot matrix is arranged on the surface of the flexible substrate 291. Since the areas of the positive convex points 294 and the negative convex points 295 are small, they can be set very flexibly as required, so that the detection area can also be formed very flexibly, which is conducive to improving the adaptability of the electrode 200.

The foregoing are embodiments of the present disclosure, and do not thus limit the scope of the present disclosure. All equivalent structural transformations made under the embodiments of the present disclosure, by using the contents of the description and drawings of the present disclosure, or directly/indirectly applied in other related fields are included in the patent protection scope of the present disclosure.

What is claimed is:

1. A movable electric device for detecting ground dirt or cleaning up wastes, comprising:
    a movable device body, comprising an electric drive means; and
    a contact detection electrode, mounted on the movable device body;
    wherein when the contact detection electrode contacts diffusible dirt, a resistance, capacitance or impedance of the contact detection electrode varies;
    wherein the contact detection electrode comprises a positive electrode and a negative electrode, and
    the thickness of the positive electrode is greater than the thickness of the negative electrode, or the thickness of the negative electrode is greater than the thickness of the positive electrode.

2. The movable electric device as claimed in claim 1, wherein the contact detection electrode comprises:
    a ring-shaped positive electrode; and
    a ring-shaped negative electrode, the ring-shaped negative electrode being provided to sleeve an outer side of the ring-shaped positive electrode, or the ring-shaped negative electrode being arranged inside the ring-shaped positive electrode;
    wherein a detection area is formed between the ring-shaped positive electrode and the ring-shaped negative electrode.

3. The movable electric device as claimed in claim 1, wherein the contact detection electrode comprises:
    a comb-teeth positive electrode, comprising a positive electrode connecting arm and a plurality of positive electrode teeth arranged along a length direction of the positive electrode connecting arm; and
    a comb-teeth negative electrode, comprising a negative electrode connecting arm and a plurality of negative electrode teeth arranged along a length direction of the negative electrode connecting arm;
    wherein the positive electrode teeth and the negative electrode teeth are arranged in a staggered manner to form a detection area between the positive electrode teeth and the negative electrode teeth.

4. The movable electric device as claimed in claim 1, wherein the contact detection electrode comprises:
    a curvilinear positive electrode, bending and extending in a direction; and
    a curvilinear negative electrode, extending along a length direction of the curvilinear positive electrode to form a detection area between the curvilinear positive electrode and the curvilinear negative electrode.

5. The movable electric device as claimed in claim 1, wherein the contact detection electrode comprises a plurality of positive electrode points and negative electrode points arranged in a staggered manner, a detection area is formed between the positive electrode points and the negative electrode points.

6. The movable electric device as claimed in claim 1, wherein the contact detection electrode comprises:
    a plurality of positive electrode plates, arranged radially from the center to the periphery; and,
    a plurality of negative electrodes, located in gaps between adjacent positive electrode plates, a detection area is formed between the positive electrode plates and the negative electrodes; or
    the contact detection electrode comprises:
    a plurality of negative electrode plates, arranged radially from the center to the periphery; and,
    a plurality of positive electrodes, located in gaps between adjacent negative electrode plates, a detection area is formed between the negative electrode plates and the positive electrodes.

7. The movable electric device as claimed in claim 1, wherein
    the contact detection electrode comprises:
    a central positive electrode and a plurality of negative electrodes arranged circumferentially around the central positive electrode, a detection area is formed between the central positive electrode and the negative electrodes; or
    the contact detection electrode comprises:
    a central negative electrode and a plurality of positive electrodes arranged circumferentially around the central negative electrode, a detection area is formed between the central negative electrode and the positive electrodes.

8. The movable electric device as claimed in claim 1, wherein the movable device body comprises a housing and a roller arranged at a bottom portion of the housing;
    the contact detection electrode is provided on an outer peripheral surface and/or side portion of the roller.

9. The movable electric device as claimed in claim 8, wherein the contact detection electrode comprises a positive electrode and a negative electrode, the positive electrode comprises a plurality of positive electrode plates connected by a positive electrode connector, a positive electrode gap is provided between two adjacent positive electrode plates;
    the negative electrodes comprise a plurality of negative electrode plates connected by a negative electrode connector, a negative electrode gap is provided between two adjacent negative electrode plates, the positive electrode and the negative electrode are arranged in parallel, and the positive electrode plates are configured to correspond to the negative electrode gaps, the negative electrode plates are configured to correspond to the positive electrode gaps.

10. The movable electric device as claimed in claim 8, wherein the movable device body comprises a first baffle provided on an axial side of the roller, the contact detection electrode is provided on the first baffle.

11. The movable electric device as claimed in claim 8, wherein the movable device body comprises a second baffle provided on an upper portion of the roller, the contact detection electrode is mounted on the second baffle.

12. The movable electric device as claimed in claim 1, wherein the movable device body comprises a chassis, the contact detection electrode is provided on the chassis.

13. The movable electric device as claimed in claim 12, wherein the contact detection electrode comprises an insulating substrate, and a substrate positive electrode and a substrate negative electrode mounted on the insulating substrate, a detection area is formed between the substrate positive electrode and the substrate negative electrode.

14. The movable electric device as claimed in claim 12, wherein the contact detection electrode comprises a fixing part and a detecting part connected to the fixing part, the fixing part is detachably connected to the chassis, the detecting part extends in a direction away from the fixing part.

15. The movable electric device as claimed in claim 1, wherein the movable device body includes a side brush, a mounting platform of the side brush protrudes outward, the contact detection electrode is provided on the mounting platform.

16. The movable electric device as claimed in claim 1, wherein the movable device body includes a rolling brush provided in the middle of a housing, the contact detection electrode is mounted on the rolling brush.

17. The movable electric device as claimed in claim 16, wherein the contact detection electrode is a flexible electrode, the contact detection electrode is arranged in parallel with bristles of the rolling brush.

18. The movable electric device as claimed in claim 1, wherein the movable device body comprises a housing, the contact detection electrode is provided on a peripheral side wall of the housing.

19. The movable electric device as claimed in claim 18, wherein the contact detection electrode comprises a flexible substrate, a positive electrode and a negative electrode of the contact detection electrode are mounted on the flexible substrate, the flexible substrate is wound and mounted on the peripheral side wall of the housing.

20. The movable electric device as claimed in claim 19, wherein the positive electrode comprises a plurality of positive electrode plates, the negative electrode comprises a plurality of negative electrode plates, the positive electrode plates and the negative electrode plates are arranged sequentially in a staggered manner on the flexible substrate.

21. The movable electric device as claimed in claim 1, wherein the positive electrode or the negative electrode has pointed teeth, or
 the positive electrode or the negative electrode has arc-shaped transitions.

22. The movable electric device as claimed in claim 1, wherein there are multiple groups of contact detection electrodes, a thickness of at least one group of the contact detection electrodes is greater than a thickness of the other group of contact detection electrodes.

23. The movable electric device as claimed in claim 1, wherein the positive electrode and the negative electrode are arranged in a ring shape and surround an outer peripheral surface of a roller along a peripheral direction of the roller.

\* \* \* \* \*